US012454397B1

(12) United States Patent
Franklin

(10) Patent No.: US 12,454,397 B1
(45) Date of Patent: Oct. 28, 2025

(54) TATTOO IMPLEMENT BLISTER PACKAGE

(71) Applicant: Travis Franklin, Sarasota, FL (US)

(72) Inventor: Travis Franklin, Sarasota, FL (US)

( * ) Notice: Subject to any disclaimer, the term of this patent is extended or adjusted under 35 U.S.C. 154(b) by 0 days.

(21) Appl. No.: 18/637,671

(22) Filed: Apr. 17, 2024

(51) Int. Cl.
*B65D 75/36* (2006.01)
*B43L 25/00* (2006.01)

(52) U.S. Cl.
CPC ............ *B65D 75/366* (2013.01); *B43L 25/00* (2013.01)

(58) Field of Classification Search
CPC .............................. B65D 75/366; B43L 25/00
USPC .......................... 206/461, 462, 469, 471, 575
See application file for complete search history.

(56) References Cited

U.S. PATENT DOCUMENTS 4,739,778 A * 4/1988 Christie ............. A45D 40/0087 206/467
5,485,917 A * 1/1996 Early ..................... A61B 50/30 206/363
6,311,837 B1 * 11/2001 Blaustein ............... B65D 75/36 206/362.2
7,032,755 B2 * 4/2006 Martins ................. A47F 5/0823 206/526
7,213,708 B2 * 5/2007 Righini .............. B23Q 11/0071 408/67
8,657,108 B2 * 2/2014 Nihei ..................... A61B 50/00 206/63.5
2007/0074989 A1 * 4/2007 Merboth ............... A61F 2/0095 206/438
2007/0170087 A1 * 7/2007 Narpes, Jr. ............. B65D 83/00 206/703
2015/0164199 A1 * 6/2015 Marcinkowski ....... A45D 27/22 206/352

* cited by examiner

*Primary Examiner* — Luan K Bui
(74) *Attorney, Agent, or Firm* — Edward P. Dutkiewicz

(57) ABSTRACT

A base having a planar rectilinear configuration with an opening there through. There is a containment portion having sides and a top portion. The containment portion being continuous with the base along the base opening, forming a recess which begins at the opening of the base and is continuous with the top portion. The top portion having at least one indent there in. The top portion having indicia located thereon. There is a bottom seal which is adhered to the base, thereby forming a seal of the containment portion recess.

1 Claim, 8 Drawing Sheets

TATTOO IMPLEMENT BLISTER PACKAGE

BACKGROUND OF THE INVENTION

Rule 1.78(F)(1) Disclosure

The Applicant has not submitted a related pending or patented non-provisional application within two months of the filing date of this present application. The invention is made by a single inventor, so there are no other inventors to be disclosed. This application is not under assignment to any other person or entity at this time.

There are no cross referenced or related applications which are direct to, or related to, the present application.

There is no research of development of this application which is federally sponsored.

FIELD OF THE INVENTION

The present invention relates to a tattoo implement blister package and more particularly pertains to blister package which has indentations for tattoo ink.

DESCRIPTION OF THE PRIOR ART

The use of blister packaging is known in the prior art. More specifically, blister packaging previously devised and utilized for the purpose of containing and selling tattoo a implement are known to consist basically of familiar, expected, and obvious structural configurations, notwithstanding the number of designs encompassed by the prior art which has been developed for the fulfillment of countless objectives and requirements.

While the prior art devices fulfill their respective, particular objectives and requirements, the prior art does not describe tattoo implement blister package that allows blister package which has indentations for tattoo ink.

In this respect, the tattoo implement blister package, according to the present invention, substantially departs from the conventional concepts and designs of the prior art, and in doing so provides a tattoo implement package which has been primarily developed for the purpose of providing a blister package which has indentations for tattoo ink.

Therefore, it can be appreciated that there exists a continuing need for a new and improved tattoo implement blister package which can be used for packaging and selling tattoo implements, such as tattoo needles, which has indentations for tattoo ink, thereby replacing the need for tattoo ink cups. In this regard, the present invention substantially fulfills this need.

SUMMARY OF THE INVENTION

In view of the foregoing disadvantages inherent in the known types of blister packaging now present in the prior art, the present invention provides an improved tattoo implement blister package. As such, the general purpose of the present invention, which will be described subsequently in greater detail, is to provide a new and improved tattoo implement blister package which has all the advantages of the prior art and none of the disadvantages.

In describing this invention, the word "coupled" may be used. By "coupled" is meant that the article or structure referred to is joined, either directly, or indirectly, to another article or structure. By "indirectly joined" is meant that there may be an intervening article or structure imposed between the two articles which are "coupled". "Directly joined" means that the two articles or structures are in contact with one another or are essentially continuous with one another.

In describing aspects of the invention, the word "generally" may be used. The term, "generally" when used to describe a configuration means that the configuration includes those aspects which are within normal manufacturing parameters of acceptance. By way of example, the term "generally round" may be used. This should be interpreted to mean that the configuration may be perfectly round, but may also have a radius which is not exact, but is within the manufacturing parameters. For example, a basketball may be generally round, but not be perfectly round.

By adjacent to a structure is meant that the location is near the identified structure.

To attain the goals, the present invention essentially comprises a tattoo implement blister package, which is herein described. The tattoo implement blister package comprises several components, in combination.

There is a base. The base has a planar rectilinear configuration with an upper surface and a lower surface, with a thickness there between. The base has a front side, a back side, a right side, and a left side. The base forms a flange, with the base flange having an opening there through.

There is a containment portion. The containment portion is continuous with the base along the base flange opening. The containment portion has a front side, a back side, a right side, a left side, a front side angled portion, a right side angled portion, and a left side angled portion. The containment portion has a top surface. The top surface of the containment portion has a planar portion and an angled portion. The planar portion of the top surface of the containment portion and the angled portion of the top surface of the containment portion having at least one indentation therein.

The containment portion front side, back side, right side, left side, front side angled portion, right side angled portion, and left side angled portion of the containment portion thereby forming a recess. The recess has an opening which is continuous at the base of the tattoo implement blister package.

The containment portion recess begins at the opening of the base flange and is continuous with the top surface of the containment portion. The planar portion of the top surface has indicia located thereon.

Lastly, there is a bottom seal adhered to the base lower surface, thereby forming a seal of the containment portion recess.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tattoo implement blister package which has all of the advantages of the prior art blister packaging and none of the disadvantages.

It is another object of the present invention to provide a new and improved tattoo implement blister package which may be easily and efficiently manufactured and marketed.

It is further object of the present invention to provide a new and improved tattoo implement blister package which is of durable and reliable constructions.

An even further object of the present invention is to provide a new and improved tattoo implement blister package which is susceptible of a low cost of manufacture with regard to both materials and labor, and which accordingly is then susceptible of low prices of sale to the consuming public, thereby making such tattoo implement blister package economically available to the buying public.

Even still another object of the present invention is to provide a tattoo implement blister package which has indentations for tattoo ink, thereby allowing a user to use the package indentations to hold tattoo ink, rather than a number of tattoo ink cups.

Lastly, it is an object of the present invention to provide a new and improved tattoo implement package which has a base having a planar rectilinear configuration with an opening there through. There is a containment portion having sides and a top portion. The containment portion being continuous with the base along the base opening, forming a recess which begins at the opening of the base and is continuous with the top portion. The top portion having at least one indent there in. The top portion having indicia located thereon. There is a bottom seal which is adhered to the base, thereby forming a seal of the containment portion recess.

It should be understood that while the above-stated objects are goals which are sought to be achieved, such objects should not be construed as limiting or diminishing the scope of the claims herein made.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
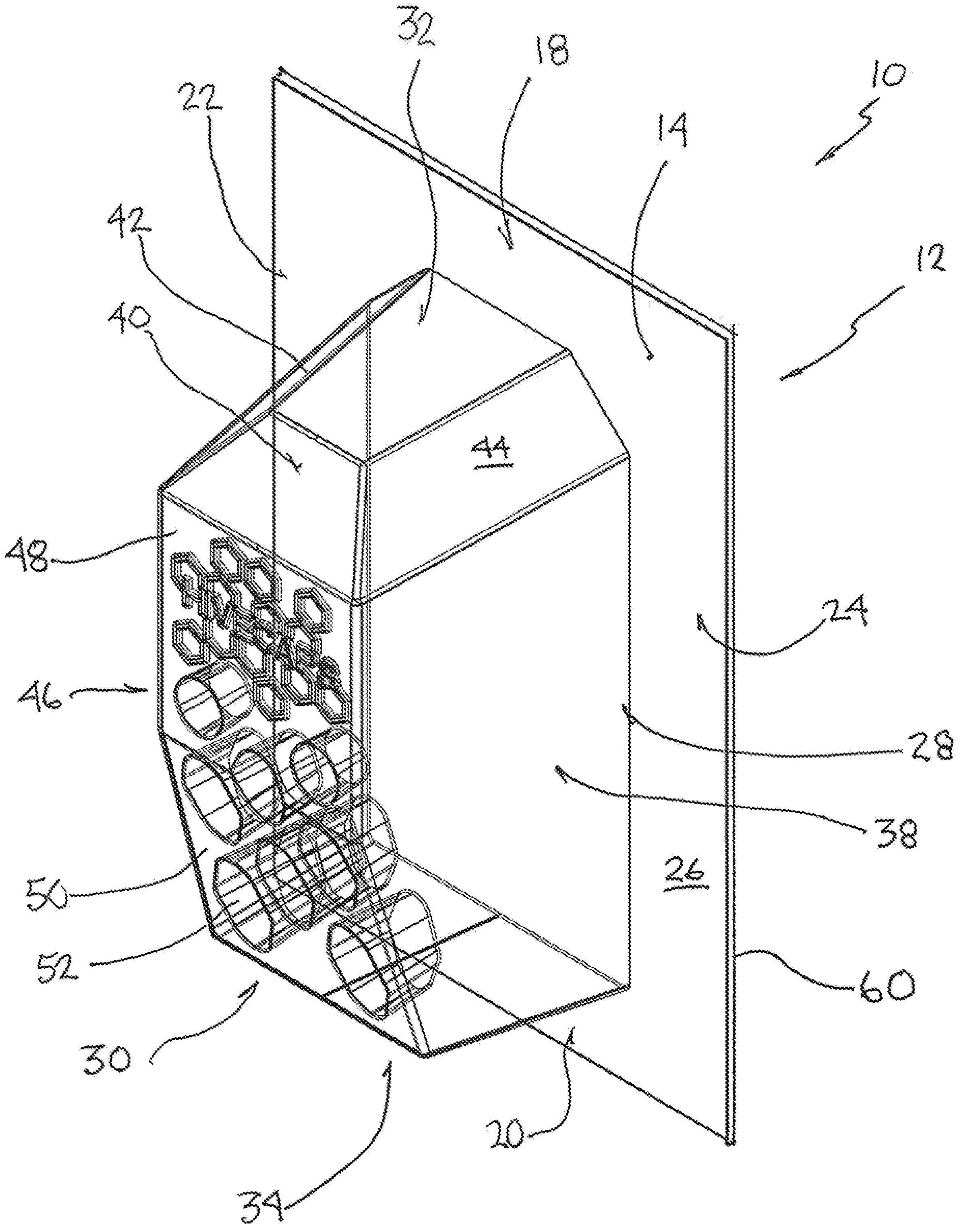
FIG. 1 is top left perspective view of the blister package for a tattoo implement.
Figure 2:
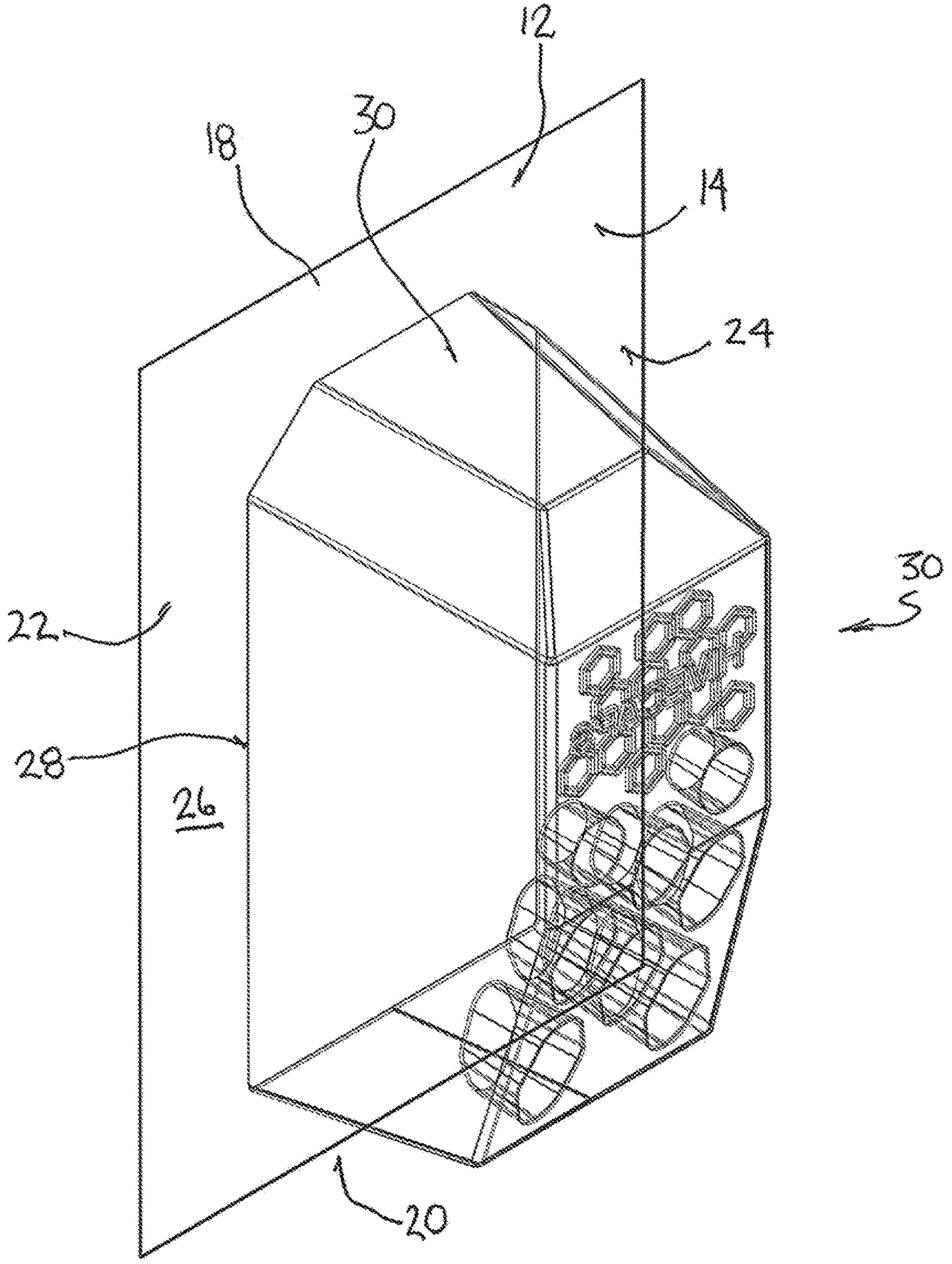
FIG. 2 is top right perspective view thereof.
Figure 3:
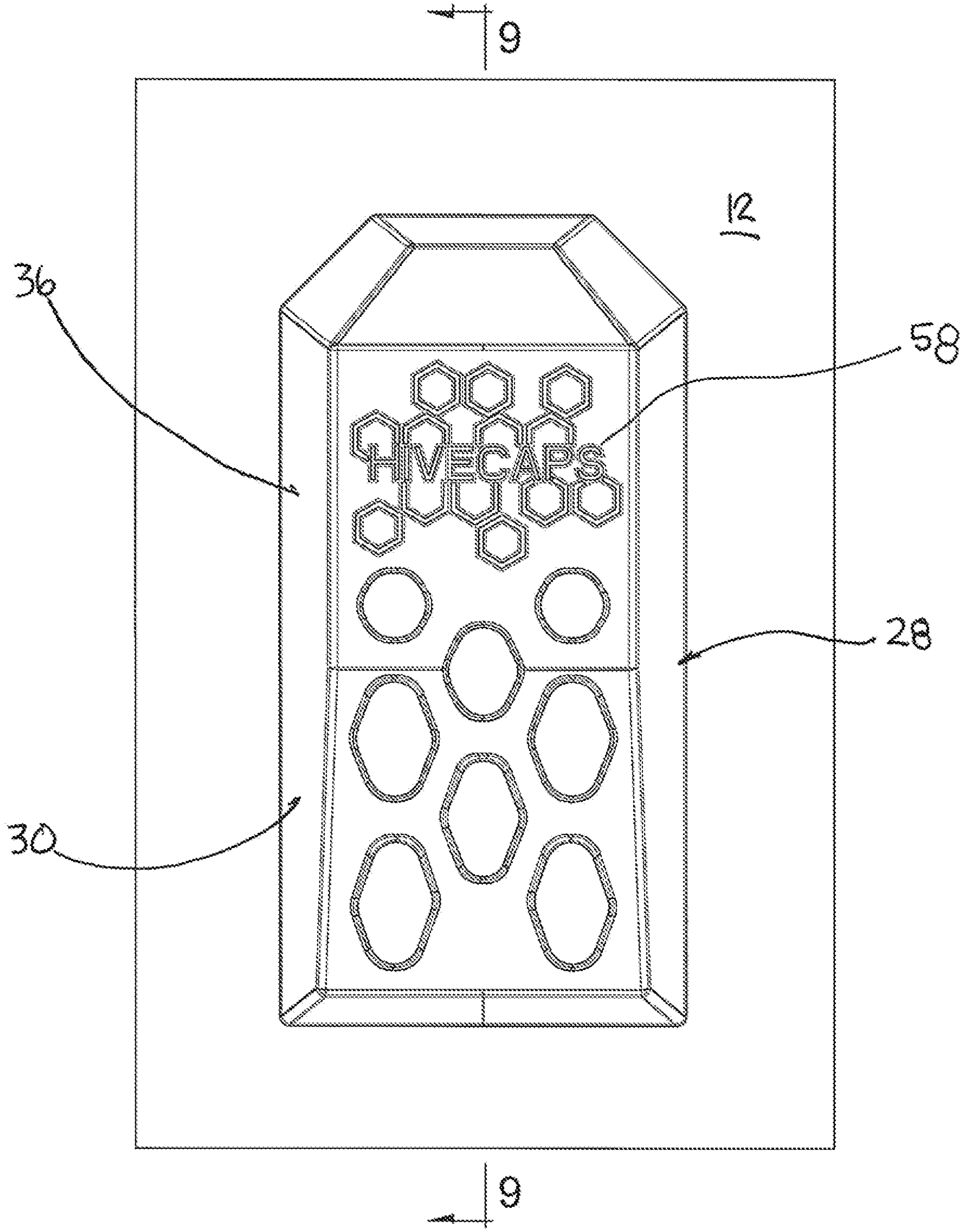
FIG. 3 is a top plan view thereof.
Figure 4:
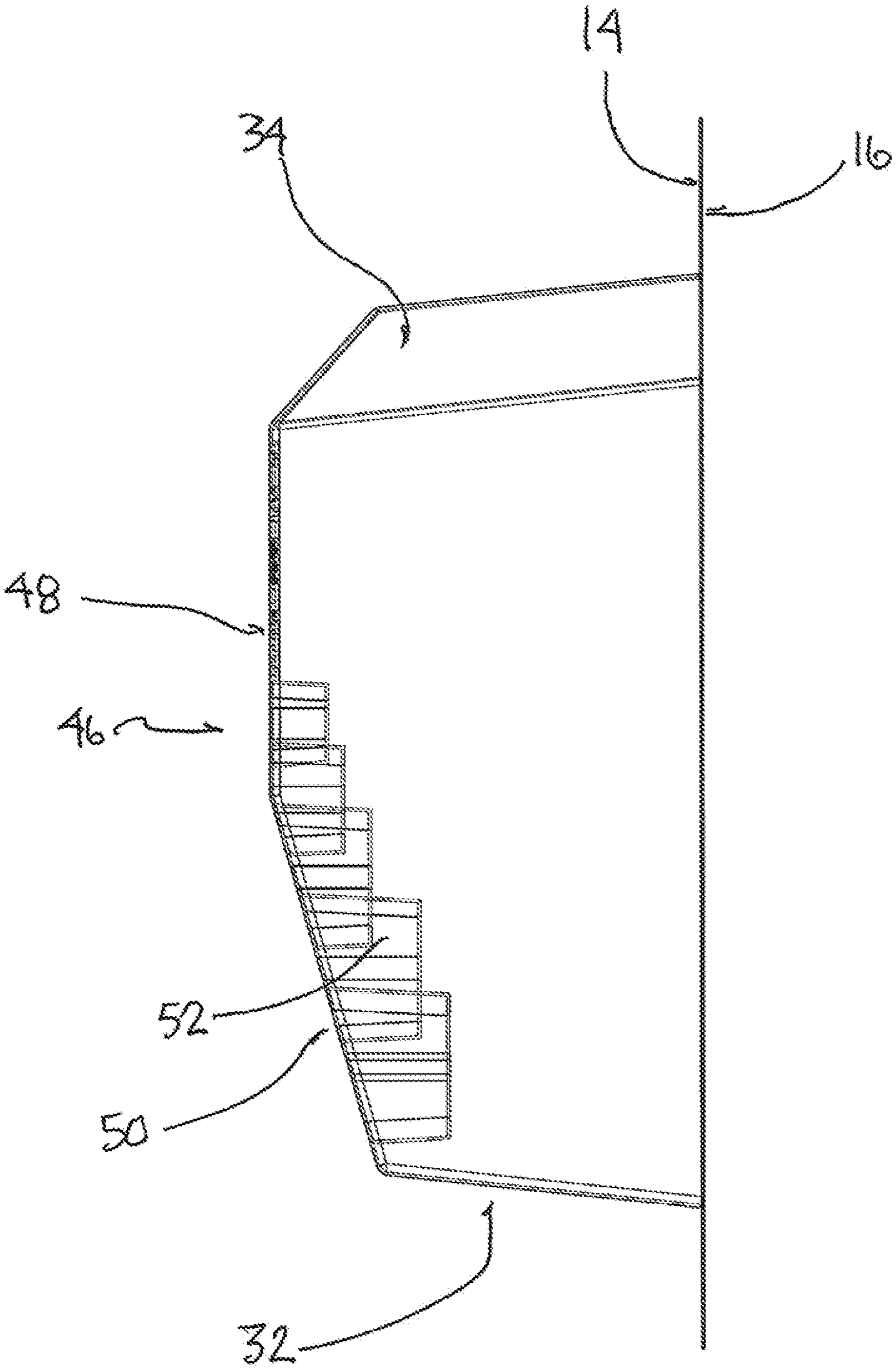
FIG. 4 is a right elevational view thereof.
Figure 5:
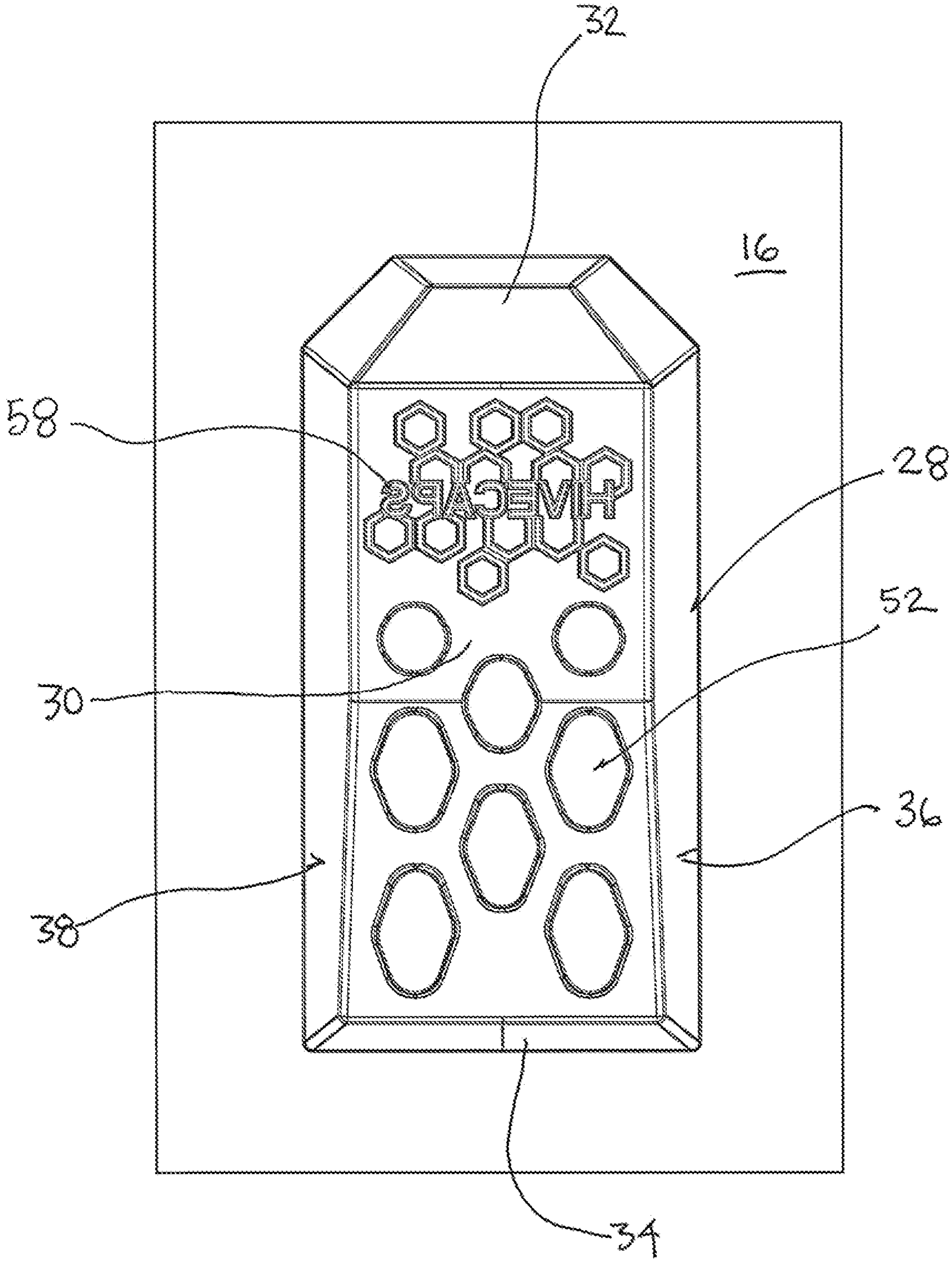
FIG. 5 is a bottom plan view thereof.
Figure 6:
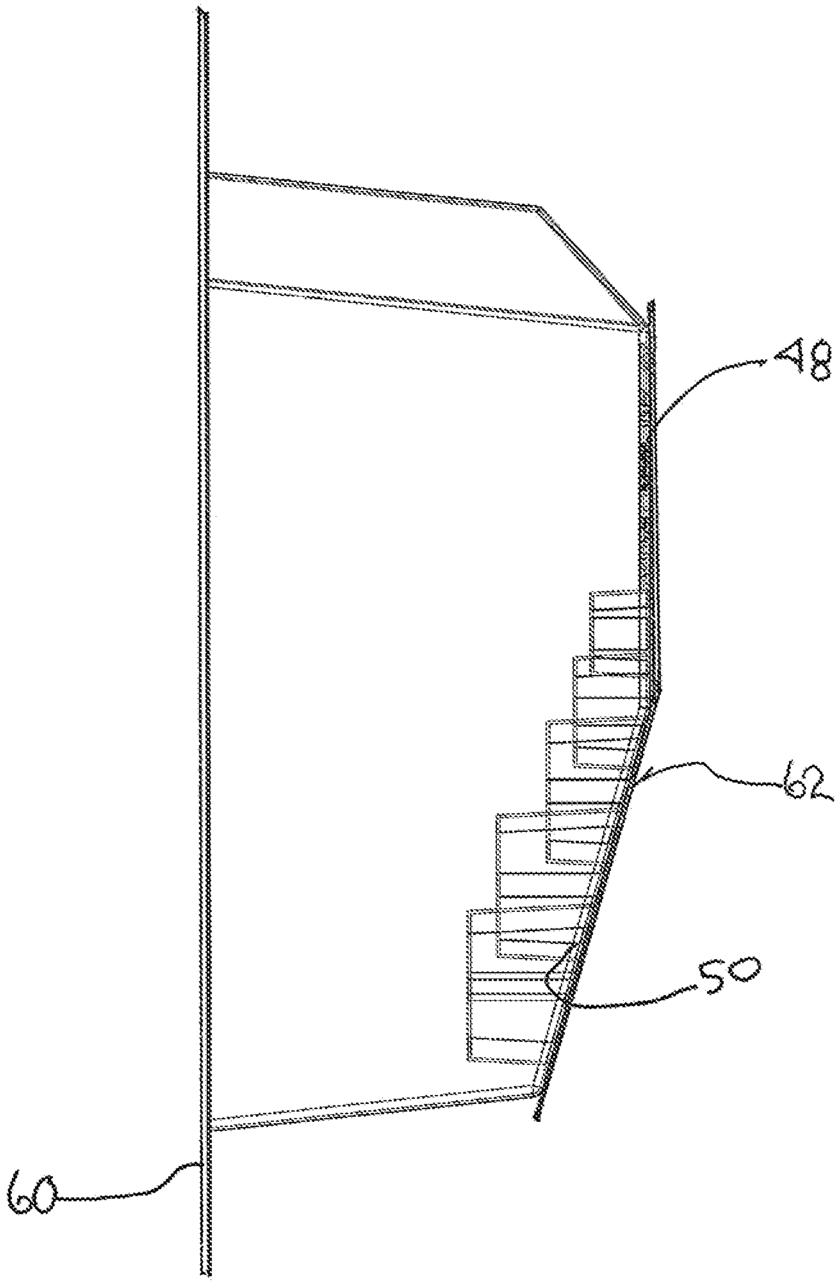
FIG. 6 is left elevational view thereof, showing a first seal and a second seal, with the second seal covering the top surface thereof.
Figure 7:
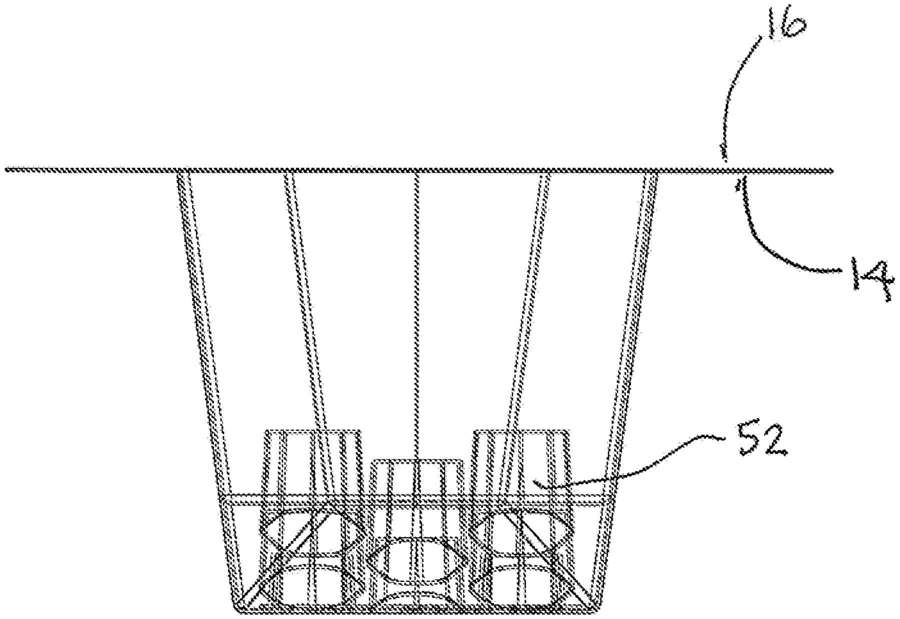
FIG. 7 is an front elevational view with the base upwards.
Figure 8:
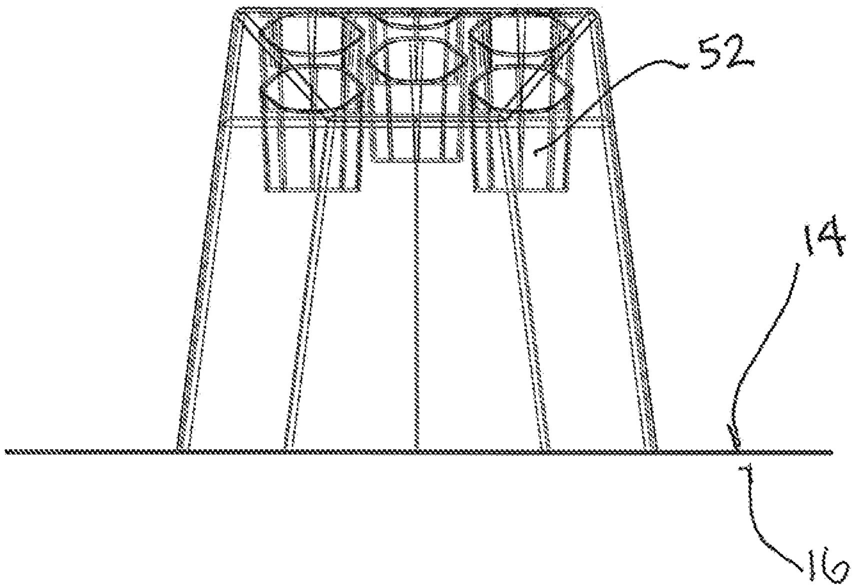
FIG. 8 is a front elevational view with the base downwards.
Figure 9:
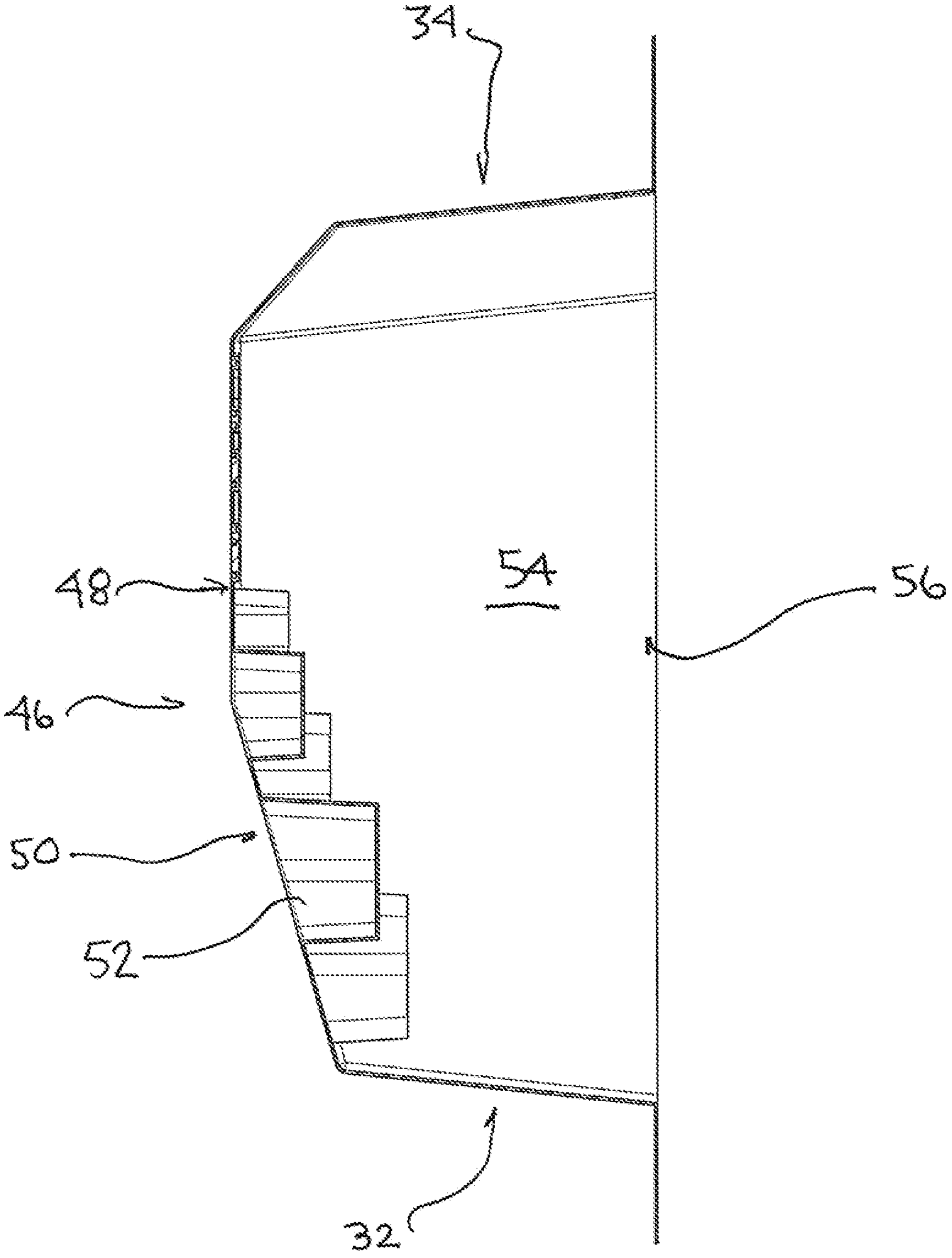
FIG. 9 is a view taken along line 9-9 of FIG. 3.

With reference now to the drawings, and in particular to FIG. 1 thereof, the preferred embodiment of the new and improved tattoo implement blister package embodying the principles and concepts of the present invention and generally designated by the reference numeral 10 will be described.

The present invention, the tattoo implement blister package 10 is comprised of a plurality of components. Such components in their broadest context include a base, a containment portion, a seal and at least one indentation in the containment portion. Such components are individually configured and correlated with respect to each other so as to attain the desired objective.

A tattoo implement blister package 10 is herein described. The tattoo implement blister package comprises several components, in combination.

There is a base 12. The base has a planar rectilinear configuration with an upper surface 14 and a lower surface 16, with a thickness there between. The base has a front side 18, a back side 20, a right side 22, and a left side 24. The base forms a flange 26, with the base flange having an opening 28 there through.

There is a containment portion 30. The containment portion is continuous with the base along the base flange opening. The containment portion has a front side 32, a back side 34, a right side 36, a left side 38, a front side angled portion 40, a right side angled portion 42, and a left side angled portion 44.

The containment portion has a top surface 46. The top surface of the containment portion has a planar portion 48 and an angled portion 50. The planar portion of the top surface of the containment portion and the angled portion of the top surface of the containment portion having at least one indentation 52 therein.

In the preferred embodiment, there are a plurality of indentations in the top surface of the containment portion.

The containment portion front side, back side, right side, left side, front side angled portion, right side angled portion, and left side angled portion of the containment portion form a recess 54. The containment portion recess has an opening 56 which is continuous at the base of the tattoo implement blister package.

The containment portion recess begins at the opening of the base flange and is continuous with the top surface of the containment portion. The planar portion of the top surface has indicia 58 located thereon.

Lastly, there is a bottom seal 60 adhered to the base lower surface, thereby forming a seal of the containment portion recess. The adherent may be a glue or some other type of process which causes the bottom seal to be adherent to the bottom surface of the base.

In another embodiment of the tattoo implement blister package, there may be a second seal 62 which is adherent to the top surface of the containment portion, thereby covering and sealing off the at least one indentation.

A user may purchase the tattoo implement blister package containing a tattoo implement, such as a needle set. In practice, the package will have a sterile interior, or, the needle may be packaged in a sterile container, and the needle container may be sealed within the containment portion recess. The user would peel off the bottom seal and remove the tattoo implement. The user would then place the implement container, flange side down, on a surface, such as a table. The at least one indentation would then be directed downward, forming at least one indentation on the upward surface. The at least one indentation may be used to hold tattoo ink. In the case where there are multiple indentations, the user may place various colors of tattoo inks into the indentations.

In the second embodiment, with the second seal over the top surface, the package may be sterilized so that the top surface of the tattoo implement blister package would be sterile so that when the second seal was removed, it would allow a user to place tattoo ink into a sterile at least one indentation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tattoo implement blister package, comprising, in combination:

a base having a planar rectilinear configuration with an upper surface and a lower surface with a thickness there between, the base having a front side and a back side and a right side and a left side, the base forming a flange with the base having an opening there through;

a containment portion being continuous with the base along the base opening, the containment portion having a front side and a back side and a right side and a left side and a front side angled portion and a right side angled portion and a left side angled portion, the containment portion having a top surface, with the top surface having a planar portion and an angled portion, the planar portion of the top surface and the angled portion of the top surface having at least one indentation therein, the containment portion front side and back side and right side and left side and front side angled portion and right side angled portion and left side angled portion of the containment portion thereby forming a recess with an opening of the recess being continuous at the base of the tattoo implement blister package, the recess beginning at the opening of the base and being continuous with the top surface of the containment portion, the planar portion of the top surface having indicia located thereon;

a bottom seal adhered to the base lower surface, thereby forming a seal of the containment portion recess; and a second seal adhered to the top surface of the containment portion, thereby forming a seal of the containment portion top surface.

* * * * *